United States Patent Office 3,046,650
Patented July 31, 1962

3,046,650
BRAZE BONDING OF COLUMBIUM
Richard L. Heestand, Oak Ridge, and Marion L. Picklesimer, Knoxville, Tenn., assignors to the United States of America as represented by the United States Atomic Energy Commission
No Drawing. Filed Nov. 23, 1959, Ser. No. 854,988
6 Claims. (Cl. 29—488)

The present invention relates generally to brazing and is particularly directed to a method of brazing columbium parts together to provide a joint having characteristics substantially equal to those of the base metal at elevated temperatures.

As herein used, the term "columbium" refers to the metal and to columbium base alloys.

Up until a few years ago, the principal use of columbium was as a minor alloying constituent of non-ferrous alloys such as stainless steel. Small additions of columbium have been found effective in increasing the high temperature properties of alloys. As the physical properties of columbium have become known, it has become apparent that the metal offers an attractive combination of properties which make it useful in a number of construction applications. For example, pure columbium is ductile and has good cold workability so that it can be machined, rolled into sheet or rod, stamped, and drawn into wire or tubing. It has a high melting point (about 2400° C.) and good corrosion and strength properties in reducing environments at high temperatures. The pure metal, as well as high columbium content alloys, finds use in high temperature applications such as jet engine and nuclear reactor components. Because of the combination of low neutron capture cross section for thermal neutrons and its corrosion and strength properties at high temperatures, it is particularly desirable for use in cladding nuclear fuel elements for operation at high temperature. Another important use for columbium is as a container material for highly corrosive media such as fused salts and liquid metals.

As these and other applications of columbium become widespread, it will be apparent that reliable methods and means for joining columbium parts must be provided. Prior to this invention, the only practical method for joining columbium parts was by fusion welding using columbium metal as the filler metal. Such a weld is formed, in an inert atmosphere, by positioning the filler metal proximate the surfaces to be joined, heating the filler metal to its melting point and then cooling the resultant joint. Welds formed by this method have been found unsuitable for service at high temperatures. In one application a series of welded joints was formed in this manner to form a container system designed to hold molten lithium. Each of the welded joints of the system was satisfactorily leak-tested at room temperature with a mass spectrometer. Yet when the system was filled with molten lithium, leaks occurred at the welded joints. Metallographic inspection revealed an exaggerated grain growth in the weld joint as well as in the heat affected areas surrounding the joint. It has been shown that a coarse grain structure, such as that produced by fusion welding using columbium as the filler metal, causes cracks to form under thermal stress and initiates corrosion along grain boundaries. Thus the excellent high temperature properties may be negated by forming welded joints with columbium filler metal.

With these prior art disadvantages in mind it is an object of the present invention to provide a novel method of brazing columbium parts such that the resultant brazed joint has physical properties substantially equal to the base metal. Another object of the invention constitutes the provision of such a brazed joint. A further object of this invention is to provide an alloy for columbium brazing wherein the constituents of said alloy are compatible with liquid metals such as molten lithium. Other objects and advantages of the present invention will be apparent from the following description.

A major aspect of this invention consists of a process of joining columbium parts which comprises providing a zirconium base alloy containing a minor proportion of columbium, proximate opposed surfaces of the parts to be joined, heating said alloy in an inert atmosphere until it melts and wets said surfaces, and thereafter cooling said melt. Another aspect of this invention consists of a modification of the above described process in which the brazing alloy is a zirconium base alloy containing small amounts of columbium and molybdenum.

The braze bonding of columbium is affected by the chemical reactivity of the metal, and by the prior fabrication history of the parts to be joined. At temperatures below its melting point columbium reacts with all of the common gases such as hydrogen, oxygen, nitrogen and carbon oxides such as CO and $CO_2$. The reaction of columbium with trace amounts of any one of these gases results in a reduction in its ductility by the formation of an embrittling phase. Thus, in order to form a ductile brazed joint, the presence of these gases in either the parts to be brazed, the brazing alloy, or the brazing atmosphere should be scrupulously avoided.

With regard to the prior fabrication history, it has been found that components produced by casting will produce a more ductile joint than components produced by other fabrication procedures such as powder metallurgy. Wrought forms of the metal can also be used to form a strong, ductile joint.

In carrying out our invention, the brazing alloy may suitably be prepared by arc melting a mixture of zirconium and from 12–25% by weight, columbium, and casting the resulting melt. The alloy thus produced is then prepared for use in brazing by preforming it into a filler rod or wire. Zirconium alloys containing less than about 12% columbium tend to produce brittle joints, even though flow characteristics of the brazing alloy are excellent. In alloys containing greater than about 25% columbium the melting point of the braze alloy is so high as to induce grain coarsening in the heat-affected zones of the base metal, leading to an embrittlement of the resultant joint. In practice, for achieving a joint having optimum ductility, strength and corrosion resistance, we prefer to use a zirconium alloy containing from 15–20%, by weight, columbuim. In order to overcome the formation of a brittle phase, without impairment of flow characteristics, while increasing the strength of the brazed joint, we add a small amount of molybdenum to the zirconium— (12–25%) columbium alloy. The molybdenum may be used in an amount ranging from .5 to 5%, by weight. The exact composition of the brazing alloy used will be determined by a balance of the requirements of the specific job in hand, and will depend on such factors as the massiveness of the components to be brazed, the cooling rates obtainable in the brazing furnace used, and the service conditions which the finished joint is expected to survive. If the service conditions include service temperatures at or about room temperature, the brazing alloy composition will be determined by the cooling rate of the joint obtainable. For example, the slower the cooling rate obtained, the higher the columbium content and/or the higher the columbium and molybdenum contents should be used to prevent the formation of an embrittling transformation product, the so-called "omega phase." If the service conditions to be imposed include service temperatures in the range of 200 to 500° C., the columbium contents should be increased about 12 percent and the molybdenum content increased towards the 5 percent level, depending on the service lifetime to be expected, in order to provide a ductile joint. At a composition of Zr-20Cb-5Mo, no formation of the embrittling phase (omega phase) will occur in a service lifetime of two to three months at a service temperature range of about 200 to 500° C. If higher strengths at any service temperature are required, the columbium and molybdenum content should be increased according to the strength required. If the service temperatures to which the joint will be subjected are greater than 550° C., the composition of the brazing alloy with be determined by the requirements of joint strength at service temperature, the transient conditions imposed upon the joint during its preparation or during the final assembly of the component of which the joint concerned is a part, and/or by the thermal cycling to be expected during the service life of the joint, rather than by the necessity for preventing the formation of the embrittling omega phase at service temperature.

The columbium surfaces to be joined are cleaned to remove grease, dirt, scale and the like. The cleaned parts are placed in abutting relationship with the filler alloy material proximate the surfaces to be joined. In an inert atmosphere, such as argon or helium, the filler material is melted until it wets the surfaces to be joined. That is to say, the base metal is said to be wetted when a liquid film of the braze alloy flows along the surface of the metal and remains even when the bulk of the liquid flows off said surface. The brazing temperature will depend on the composition of the brazing alloy, but will generally fall within the range 1725° C. to 1750° C. when the zirconium-niobium alloy is used; the brazing temperature is somewhat higher when the zirconium-niobium-molybdenum alloy is used. As the source of heat, an inert gas-shielded torch may be used. In order to reach the brazing temperature at a fast rate, it has been found practical to employ a tungsten electrode inert gas-shielded arc or other equivalent means as the source of heat.

During the brazing operation, it is important that the temperature of the parts to be brazed and the brazing alloy be raised quickly from just below the melting point of the alloy to the minimum brazing temperature. Quick melting of the brazing alloy permits melting and capillary flow of the molten brazing alloy through the entire joint. If the temperature is raised too slowly, a portion of the brazing alloy will become molten before the balance whereupon said portion will start to freeze and alloy with the base metal thereby blocking the joint to further flow of the balance of said brazing alloy into the joint.

After the brazing alloy has melted and wet the surfaces to be joined, the melt and the heat-affected areas surrounding the joint are cooled in an inert atmosphere. The adverse effects of such gases as hydrogen, oxygen, nitrogen, etc., on columbium have previously been pointed out. Accordingly, the entire brazing process of this invention should be carried out in an inert atmosphere such as helium or argon.

The parts to be brazed in accordance with this invention may have any shape or configuration. They may be in the form of sheet, tubing, bar, rod, plates, etc., or any combination thereof; nor is this invention limited to the type of joint formed. Butt, lap, scarf and saddle joints, tube to header and other forms of brazed joints are within the scope of this invention.

The parts to be joined may be in contact or separated by a gap, or clearance, as much as 0.030 inch wide. In each case, the molten brazing alloy will wet and fill the gap by capillary action to produce a sound, non-porous, ductile joint.

The following example will illustrate the advantages of our invention.

*Example*

Experimental joints in ½-inch diameter columbium tubing using braze metal wire of 85Zr-15Nb and 80Zr-15Nb-5Mo compositions were made in an argon atmosphere dry box using a tungsten electrode arc as the soure of heat. On melting the braze metal it was observed that it flowed smoothly, filled the joint crack by capillary action, wet the columbium base metal well, and resulted in a ductile joint. The ductility of the brazed joints was tested by sawing the tube lengthwise across the joint and bending the resultant tube halves through an angle of 90°. Metallographic macrostructure and microstructure specimens of the brazed joint were and prepared and examined. The joint specimens showed no brittleness in either the braze alloy, as deposited, or in the base member as evidenced by the fact that no cracking was observed. The specimens showed that the braze metal had dissolved part of the base metal, had wet the base metal completely, had filled the joint by capillary action and filleted on the underside.

A number of brazed joints formed in accordance with the above example were exposed to liquid lithium at 1000° C. for 100 hours. A metallographic examination of the welded joints showed a fine grain structure with no evidence of intergranular corrosion. The joints were found to be ductile after exposure as evidenced by their ability to be bent through a 90° angle without cracking in the brazed joint.

In a parallel test, a number of welded columbium parts in which the weldments were formed with columbium metal as the filler material were exposed to the same medium for the same length of time. These welds were examined and found to have a coarse grain structure in the welds as well as in the heat affected areas surrounding each of the welds. Furthermore, these welds were brittle as demonstrated by their inability to be bent through even a small angle without extensive cracking.

Since many embodiments may be made of the invention hereinbefore described and since many variations of this invention may occur to those skilled in the art, it will be clearly understood that the scope of this invention is not to be limited to the particulars disclosed therein, but is to be defined by the following claims:

We claim:

1. A method of brazing columbium parts together which comprises the steps of disposing the surfaces of said parts to be brazed together in abutting relationship with a brazing alloy disposed adjacent said abutting surfaces, said brazing alloy consisting essentially of, by weight, 12–25 percent columbium, 0.5–5 percent molybdenum, and the balance zirconium, heating said alloy to at least its melting point to braze said parts together and thereafter cooling the brazed joint, said heating, melting and cooling taking place in an atmosphere selected from argon and helium.

2. The method according to claim 1, in which the brazing alloy consists essentially of, by weight, 15–20 percent columbium, 0.5–5 percent molybdenum and the balance zirconium.

3. The method of brazing columbium parts together which comprises the steps of cleaning the surfaces to be joined to remove impurities, disposing the cleaned surfaces in abutting relationship with a brazing alloy disposed adjacent said abutting surfaces, said brazing alloy consisting essentially of, by weight, 12–25 percent columbium 0.5–5 percent molybdenum, and the balance zirconium, heating said alloy to at least its melting point to braze said parts together and thereafter cooling the brazed joint, said heating and cooling taking place in an inert atmosphere selected from argon and helium.

4. A method of brazing columbium parts together which comprises the steps of assembling the parts to be brazed to form a joint, disposing proximate said joint a brazing alloy consisting essentially of, by weight, 12–25 percent columbium, 0.5–5 percent molybdenum and the balance zirconium, in an inert atmosphere, heating said alloy to at least its melting point to cause said alloy to flow into the joint and bring about brazing of said parts to be joined and thereafter cooling the brazed joint, said heating and cooling taking place in an atmosphere selected from the class argon and helium.

5. In an improved process for brazing columbium parts together in which the formation of a brittle phase in the heat-affected area is avoided, the steps which comprise disposing selected surfaces of said parts to be brazed together in abutting relationship with a brazing alloy disposed adjacent said abutting surfaces, said brazing alloy being selected from the group consisting of, by weight, (A) 12–25% columbium and the balance zirconium (B) 0.5–5% molybdenum, 12–25% columbium and the balance zirconium, heating said alloy to at least its melting point to braze said parts together, and thereafter cooling the brazed joint, said heating and cooling taking place in an atmosphere selected from argon and helium.

6. A method of brazing columbium parts together which comprises the steps of disposing the surfaces of said parts to be brazed together in abutting relationship with a brazing alloy disposed adjacent said abutting surfaces, said brazing alloy consisting essentially of, by weight, 12–25 percent columbium and the balance zirconium, heating said alloy to at least its melting point to braze said parts together and thereafter cooling the brazed joint, said heating, melting and cooling taking place in an atmosphere selected from argon and helium.

References Cited in the file of this patent

UNITED STATES PATENTS

| | | |
|---|---|---|
| 1,221,769 | Cooper | Apr. 3, 1917 |
| 2,784,084 | Marsh et al. | Mar. 5, 1957 |
| 2,932,887 | McCuaig et al. | Apr. 19, 1960 |

UNITED STATES PATENT OFFICE
CERTIFICATE OF CORRECTION

Patent No. 3,046,650            July 31, 1962

Richard L. Heestand et al.

It is hereby certified that error appears in the above numbered patent requiring correction and that the said Letters Patent should read as corrected below.

Column 2, line 49, for "columbuim" read -- columbium --; column 3, line 42, for "Quick" read -- Quick --; column 4, line 3, for "soure" read -- source --; line 11, strike out "and", first occurrence; lines 62 and 63, after "columbium", insert a comma; same column 4, line 66, strike out "inert".

Signed and sealed this 28th day of May 1963.

(SEAL)
Attest:

ERNEST W. SWIDER
Attesting Officer

DAVID L. LADD
Commissioner of Patents